United States Patent
Botman et al.

(10) Patent No.: US 10,517,424 B2
(45) Date of Patent: Dec. 31, 2019

(54) EDUCTOR SUITABLE FOR USE IN AN ASSEMBLY FOR PREPARING A LIQUID PRODUCT, AN ASSEMBLY FOR PREPARING A LIQUID PRODUCT AND A SYSTEM FOR PREPARING A LIQUID PRODUCT

(71) Applicant: FrieslandCampina Nederland B.V., Amersfoort (NL)

(72) Inventors: Maarten Joannes Botman, Enschede (NL); Lambertus Cornelus Adriaan Oppers, Erp (NL); Wiebe Nicolaas Van Druten, Wageningen (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 341 days.

(21) Appl. No.: 15/512,117

(22) PCT Filed: Sep. 18, 2015

(86) PCT No.: PCT/NL2015/050648
§ 371 (c)(1),
(2) Date: Mar. 17, 2017

(87) PCT Pub. No.: WO2016/043590
PCT Pub. Date: Mar. 24, 2016

(65) Prior Publication Data
US 2017/0273500 A1    Sep. 28, 2017

(30) Foreign Application Priority Data
Sep. 19, 2014    (NL) ...................................... 2013499

(51) Int. Cl.
*A47J 31/44*    (2006.01)
*B01F 3/04*    (2006.01)

(52) U.S. Cl.
CPC ....... *A47J 31/4485* (2013.01); *A47J 31/4496* (2013.01); *B01F 3/04248* (2013.01); *B01F 3/04446* (2013.01)

(58) Field of Classification Search
CPC ................ A47J 31/4496; A47J 31/4485; A47J 31/4489; B01F 3/04446; B01F 3/04248
(Continued)

(56) References Cited

U.S. PATENT DOCUMENTS

| 4,715,274 | A | * | 12/1987 | Paoletti | ............... | A47J 31/4485 239/113 |
| 4,949,631 | A | * | 8/1990 | Fregnan | ............... | A47J 31/4485 261/DIG. 26 |
| 8,069,778 | B2 | * | 12/2011 | Gierth | ................. | A47J 31/4485 366/165.2 |

FOREIGN PATENT DOCUMENTS

| EP | 0 339 292 A1 | 11/1989 |
| EP | 0 344 859 A1 | 5/2014 |
| WO | WO-2014/069993 A1 | 5/2014 |

OTHER PUBLICATIONS

International Search Report issued in International Patent Application No. PCT/NL2015/050648, dated Feb. 11, 2016.

\* cited by examiner

*Primary Examiner* — Reginald Alexander
(74) *Attorney, Agent, or Firm* — Sunit Talapatra; Foley & Lardner LLP

(57) ABSTRACT

An eductor suitable for use in an assembly for preparing a liquid product comprises a housing having a substantially cylindrical wall. The eductor comprises an injector valve which is displaceably arranged within the cylindrical wall from first position to a second position longitudinally spaced from the first position, and vice versa. On its outer surface the injector valve comprises two annular protrusions which (Continued)

are spaced from each other, each of the annular protrusions engaging the inner surface of the cylindrical wall for forming a seal therewith, said annular protrusions together with the inner surface of the cylindrical wall forming an annular chamber, said protrusions being arranged for isolating the annular chamber from fluid communication with any environment outside the annular protrusions when said injector valve is positioned in the first position or the second position or any position in between.

21 Claims, 5 Drawing Sheets

(58) Field of Classification Search
USPC .................................................. 99/323.1, 293
See application file for complete search history.

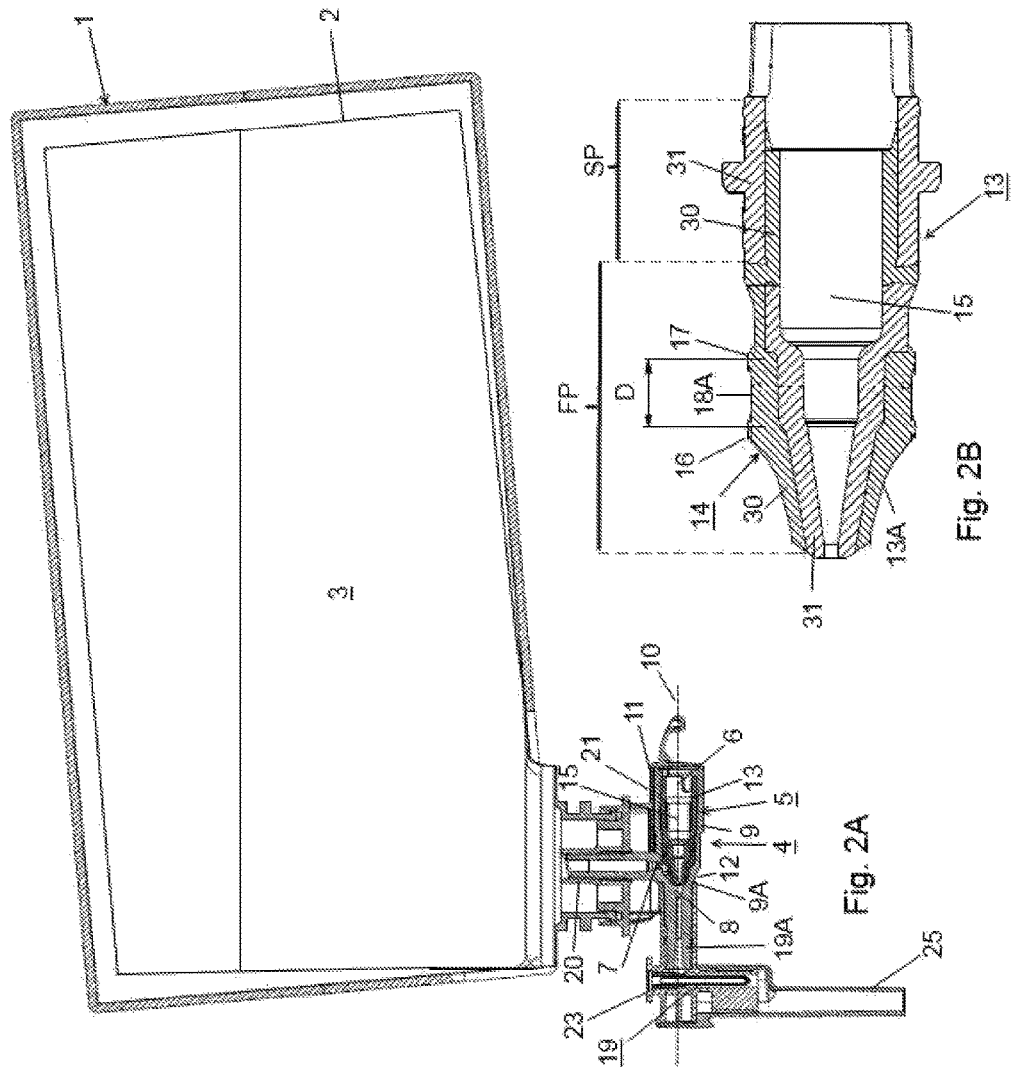

EDUCTOR SUITABLE FOR USE IN AN ASSEMBLY FOR PREPARING A LIQUID PRODUCT, AN ASSEMBLY FOR PREPARING A LIQUID PRODUCT AND A SYSTEM FOR PREPARING A LIQUID PRODUCT

CROSS-REFERENCE TO RELATED APPLICATIONS

This application is the National Phase of International Patent Application No. PCT/NL2015/050648, filed Sep. 18, 2015, published on Mar. 24, 2016 as WO 20160/043590 A1, which claims priority to Netherlands Patent Application No. 2013499, filed Sep. 19, 2014. The contents of these applications are herein incorporated by reference in their entirety.

FIELD OF THE INVENTION

The invention relates to an eductor suitable for use in an assembly for preparing a liquid product, said eductor comprising a housing having a substantially cylindrical wall with a longitudinal axis extending from one end of the cylindrical wall to the other end of the cylindrical wall opposite the one end, said housing having a first liquid inlet at said one end of the cylindrical wall for supplying a first liquid to the eductor in a direction at least substantially parallel to the longitudinal axis, said housing comprising a second liquid inlet at said other end of the cylindrical wall for supplying a second liquid to the eductor in a direction having a component perpendicular to the longitudinal axis, said housing comprising a liquid product outlet for discharging a liquid product from the eductor in a direction at least substantially parallel to the longitudinal axis, said second liquid inlet of the eductor seen in longitudinal direction being positioned between the first liquid inlet and the liquid product outlet, said eductor further comprising an injector valve positioned within the cylindrical wall, said injector valve comprising an outer surface partly contacting an inner surface of the cylindrical wall and a central, longitudinal channel for supplying the first liquid from the first liquid inlet to the liquid product outlet, said injector valve further being displaceably arranged within the cylindrical wall from first position to a second position longitudinally spaced from the first position, and vice versa.

The invention also relates to an assembly for preparing a liquid product comprising a holder containing a second liquid and such an eductor.

The invention further relates to a system for preparing a liquid product comprising a product preparation apparatus for preparing said liquid product and such an assembly.

Such an eductor, assembly and system are known from WO-A1-2014/069993. According to WO-A1-2014/069993 the eductor is incorporated in a disposable assembly, e.g. containing a concentrated food product, such as milk based concentrate, for preparing a liquid food product, such as milk foam or froth, in cooperation with a liquid product preparation apparatus. The liquid product preparation apparatus of WO-A1-2014/069993 comprises a water source, a heater for heating water, a means for pressurizing water and a source of pressurized gas. Although the liquid product prepared by the system comprising the disposable assembly and the liquid product preparation apparatus of WO-A1-2014/069993 is of high quality, while the operation thereof is highly user-friendly, it is desired to even further improve the quality thereof. In addition there exists a long felt need in the art to provide assemblies and systems for preparing a liquid product, especially when the prepared liquid product contains a perishable liquid food product such as milk, to reduce any risk of contamination of the prepared liquid product, in particular when the assemblies or systems are used over a prolonged period of time.

SUMMARY OF THE INVENTION

It is therefore an object of the present invention to provide an eductor suitable for use in an assembly for preparing a liquid product, an assembly for preparing a liquid product comprising a holder containing a second liquid and such an eductor, and a system for preparing a liquid product comprising a product preparation apparatus for preparing said liquid product and such an assembly, with which a liquid product, in particular a liquid food product, can be prepared with a high quality over a prolonged period of time with a reduced risk of contamination.

To this end, the invention provides in a first aspect an eductor suitable for use in an assembly for preparing a liquid product, said eductor comprising a housing having a substantially cylindrical wall with a longitudinal axis extending from one end of the cylindrical wall to the other end of the cylindrical wall opposite the one end, said housing having a first liquid inlet at said one end of the cylindrical wall for supplying a first liquid to the eductor in a direction at least substantially parallel to the longitudinal axis, said housing comprising a second liquid inlet at said other end of the cylindrical wall for supplying a second liquid to the eductor in a direction having a component perpendicular to the longitudinal axis, said housing comprising a liquid product outlet for discharging a liquid product from the eductor in a direction at least substantially parallel to the longitudinal axis, said second liquid inlet of the eductor seen in longitudinal direction being positioned between the first liquid inlet and the liquid product outlet, said eductor further comprising an injector valve positioned within the cylindrical wall, said injector valve comprising an outer surface partly contacting an inner surface of the cylindrical wall and a central, longitudinal channel for supplying the first liquid from the first liquid inlet to the liquid product outlet, said injector valve further being displaceably arranged within the cylindrical wall from first position to a second position longitudinally spaced from the first position, and vice versa, characterized in that the injector valve on its outer surface comprises two annular protrusions which are spaced from each other by a distance that at least equals the distance between the first position and the second position of the injector valve, each of the annular protrusions engaging the inner surface of the cylindrical wall for forming a seal therewith, said annular protrusions together with the inner surface of the cylindrical wall forming an annular chamber, said protrusions being arranged for isolating the annular chamber from fluid communication with any environment outside the annular protrusions when said injector valve is positioned in the first position or the second position or any position in between and/or wherein the inner surface of the cylindrical wall comprises two annular protrusions which are spaced from each other by a distance that at least equals the distance between the first position and the second position of the injector valve, each of the annular protrusions engaging the outer surface of the injector valve for forming a seal therewith, said annular protrusions together with the outer surface of the injector valve forming an annular chamber, said protrusions being arranged for isolating the annular chamber from fluid communication with any environment outside the annular protrusions when said injector valve is positioned in the first position or the second position or any position in between. The distance between the two annular protrusions is preferably larger than the distance between the first position and the second position of the injector valve. On the other hand the distance between the two annular protrusions should not be too large and preferably is smaller than about 5 times the distance between the first position and the second position of the injector valve so that mechanical loads are distributed over both the protrusions for providing sufficient mechanical stability. Please note that the injector valve on its outer surface may comprise more than two annular protrusions but that in accordance with the invention two of these annular protrusions are spaced from each other by a distance that at least equals the distance between the first position and the second position of the injector valve.

In an embodiment of an eductor according to the invention the protrusions are made in a first part of a first material withstanding thermal loads (including thermal expansion and thermal shrinkage) exerted thereon while still providing sufficient compressibility and elasticity (i.e. sufficiently short relaxation time) for providing a correct seal, said first part being hermetically attached to a second part of a second material, different from the first material, said second material providing mechanical stability over a prolonged period of time to the first part with the protrusions. By hermetically attaching the protrusions to a second part formation of any fluid communication paths is prevented. It is then preferred that the first part of the first material and the second part of the second material are chemically bonded to each other along their contact surface without using additives or a third material. Such a chemical bonding without any additives or a third material ensures a correct hermetical attachment so that no fluid communications paths or leakage paths are created during use of the eductor over a prolonged period of time. In particular the first part and the second part are formed by two-component injection moulding. Depending on the chosen materials, other methods in which the first and second material are hermetically bonded to each other can be used, such as 3D-printing.

Alternatively the protrusions can be formed by separate sealing means, such as e.g. O-rings or equivalent, which separate sealing means are permanently and hermetically attached to the outer surface such that no fluid communication path or leakage path is formed. Such permanent attachment can e.g. be realized by means of gluing, heat sealing, etc. However, depending on the thermal and/or mechanical loads exerted thereon during use, such permanent attachment might over prolonged periods of time loose its hermetical function which could lead to undesired leakage paths in the attachment, but such permanent attachment with a third component, such as e.g. glue, provides a sufficient hermetical function to prevent creation of leakage paths when the eductor is used for shorter periods of time.

The invention is based on the insight that the possible contamination of the liquid product prepared by the system of WO-A1-2014/069993 is caused by the eductor thereof, as will be explained with reference to FIGS. 1A-1C which depict an enlarged view of a part of the system of WO-A1-2014/069993 showing in particular the eductor thereof in more detail.

In FIGS. 1A-1C, the situation is shown in which the known disposable assembly comprising the eductor 1' is connected to the liquid product preparation apparatus having an injector valve actuator 2'. The injector valve actuator 2' is in engagement with the injector valve 3' and is operable under control of an operating device of the liquid product preparation apparatus for positioning the injector valve 3' either in a first, i.e. an enabling position for enabling communication of a water (as first liquid) inlet 4' of the eductor 1' with a concentrated milk (as second liquid) inlet 5' of the eductor 1' (as shown in FIG. 1B) or for positioning the injector valve 3' in a disabling position (as shown in FIGS. 1A and 1C) for disabling communication of the water inlet 4' of the eductor 1' with the concentrated milk inlet 5' of the eductor 1'. In the situation shown in FIG. 1A communication of the water inlet of the eductor with the liquid product outlet is disabled, while in the situation shown in FIG. 1C communication of the water inlet of the eductor with the liquid product outlet is enabled, e.g. for flushing purposes. The injector valve 3' comprises at its outer surface a single protrusion B' which engages with the inner surface of the cylindrical wall 6' of the housing 7' of the eductor 1'.

When the injector valve 3' is withdrawn from the position indicated in FIG. 1A to the position indicated in FIG. 1B it is possible that concentrated milk settles on the inner surface of the cylindrical wall 6' of the housing 7' of the eductor 1' at the position indicated by the reference C' or an any other surface of e.g. the injector valve 3' as indicated exemplary with reference number C''. When thereafter the injector valve 3' is displaced back towards the situation depicted in FIG. 1C, the protrusion B' is displaced over the settled concentrated milk C', which then can come in contact with air which can be present at that position as a result of leakage paths LP', thereby contaminating the settled concentrated milk C'.

By in accordance with the invention using two annular protrusions which are spaced from each other by a distance that at least equals the distance between the first position and the second position of the injector valve, concentrated milk or in general second liquid settled on any surface only comes into contact with medium, such as gas, present in the annular chamber formed between the two protrusions, as a result of which contamination is strongly reduced. In the advantageous embodiment of an eductor according to the invention in which the annular chamber is filled with a inert or sterile gas, such as nitrogen, carbon dioxide, or helium, contamination can be prevented practically complete. According to the invention contamination is at least strongly reduced in that during operation, i.e. during displacement of the injector valve, any settled second liquid is prevented from coming into contact with any environment outside the annular chamber, which annular chamber thus functions as a sterile, sliding sluice.

In an embodiment of an eductor according to the invention the first material is for instance a thermoplastic elastomer (TPE), a silicone, PPE, 1-PPE or LL-PPE. In particular when the first liquid and/or the second liquid is heated, in particular heated to a temperature above 95° C., the first material and thus the protrusions made thereof can withstand the thermal loads (including thermal expansion and thermal shrinkage) exerted thereon while still providing sufficient compressibility and elasticity (i.e. sufficiently short relaxation time) for providing a correct seal against the inner surface of the cylindrical wall. It will be clear that also other materials fulfilling the requirements can be used for the first material.

In a still further embodiment of an eductor according to the invention the second material is polypropylene (PP), a polyarylether ketone PAEK, in particular PEEK (polyether ether ketone), a Polyethylene terephthalate thermoplastic (PET) polymer, a Polysulfone thermoplastic (PES) polymer, or a Polyoxy methylene thermoplastic (POM) polymer. Said second material provides additional mechanical stability to the first material, ensuring that the protrusions retain their shape over a prolonged period of time and can fulfil the demands regarding resistance to thermal loads, compressibility and relaxation time as mentioned above. It will be clear that also other materials fulfilling the requirements can be used for the second material.

In a particularly advantageous embodiment of an eductor according to the invention in a first portion of the injector valve or the inner surface of the cylindrical wall the first part of the first material is positioned radially outwards of the second part of the second material and in a second portion of the injector valve or the inner surface of the cylindrical wall the first part of the first material is positioned radially inwards of the second part of the second material.

In a still further embodiment of an eductor according to the invention the liquid product outlet is formed by a converging wall part of the cylindrical wall, wherein the injector valve comprises a converging part directed towards the converging wall part, said first position of the injector valve being an enabling position for enabling fluid communication of the second liquid inlet of said eductor with the liquid product outlet of said eductor, said second position being a disabling position for disabling fluid communication of the second liquid inlet of said eductor with the liquid product outlet of said eductor and vice versa, wherein in the second position of the injector valve an outer surface of the converging part engages with the inner surface of the converging wall part of the cylindrical wall for forming a seal therewith. In this manner the first and the second liquid can be mixed when the injector valve is in the enabling position, while in the disabling position only the first liquid can be supplied to the liquid product outlet, thereby providing the possibility to prepare a large variety of liquid products. It is then preferred when the outer surface of the converging part of the injector valve is made of the first material.

In a second aspect the invention provides an assembly for preparing a liquid product, said assembly comprising:
 a holder containing a second liquid,
 an eductor according to any one of the preceding claims;
 a second liquid tube connecting said holder to the second liquid inlet of said eductor;
 a first liquid inlet tube connecting the first liquid inlet of said eductor with a first liquid connection of the assembly, said first liquid connection being configured for connection to an external source of first liquid, preferably a first liquid under pressure; and
 a liquid product outlet tube connecting the liquid product outlet of the eductor to an outlet connection of the assembly for discharging a prepared liquid product from the assembly.

In a third aspect the invention provides an assembly for preparing a liquid product, said assembly comprising:
 a holder containing a second liquid;
 an eductor according to the invention;
 a microfiltration device having a liquid product inlet and a liquid product outlet;
 a transfer tube connecting the liquid product outlet of said eductor with the liquid product inlet of said microfiltration device;
 a second liquid tube connecting said holder to the second liquid inlet of said eductor;
 a first liquid inlet tube connecting the first liquid inlet of said eductor with a first liquid connection of the assembly, said first liquid connection being configured for connection to an external source of first liquid, preferably a first liquid under pressure;

a gas inlet tube connecting said microfiltration device to a gas connection of said assembly, said gas connection being configured for connection to an external source of gas under pressure; and
 a liquid product outlet tube connecting the liquid product outlet of the microfiltration device to an outlet connection of the assembly for discharging a prepared liquid product from the assembly. Preferably, the second liquid is a liquid food product, preferably a milk based concentrate, and said first liquid is water.

In a fourth aspect the invention provides a system for preparing a liquid product, said system comprising a product preparation apparatus for preparing said liquid product and an assembly according to the invention, said liquid product preparation apparatus comprising a first liquid source, a heater for heating said first liquid, means for supplying said first liquid, preferably means for pressurizing said first liquid, said means for supplying said first liquid being configured for detachable connection to the first liquid connection of the assembly for supplying the first liquid to the first liquid inlet of the eductor of the assembly, a source of pressurized gas, said source of pressurized gas being configured for detachable connection to the gas connection of said assembly for supplying pressurized gas to the gas inlet of the microfiltration device. Preferably the product preparation apparatus comprises an injector valve actuator, said injector valve actuator being arranged for engaging the injector valve, said injector valve actuator being operable for positioning the injector valve in the enabling position and for positioning the injector valve in the disabling position, respectively.

BRIEF DESCRIPTION OF THE DRAWINGS

The invention will be further explained with reference to the Figures, in which non-limiting exemplary embodiments of an eductor, an assembly and a system for preparing a liquid product in accordance with the invention are shown. In the drawing:

FIG. 2A shows a schematic view in cross section of a disposable assembly according to an exemplary embodiment of the invention;

FIG. 2B shows a schematic enlarged view of the injector valve of the disposable assembly shown in FIG. 2A;

DETAILED DESCRIPTION OF EXEMPLARY EMBODIMENTS

Figure 1A:
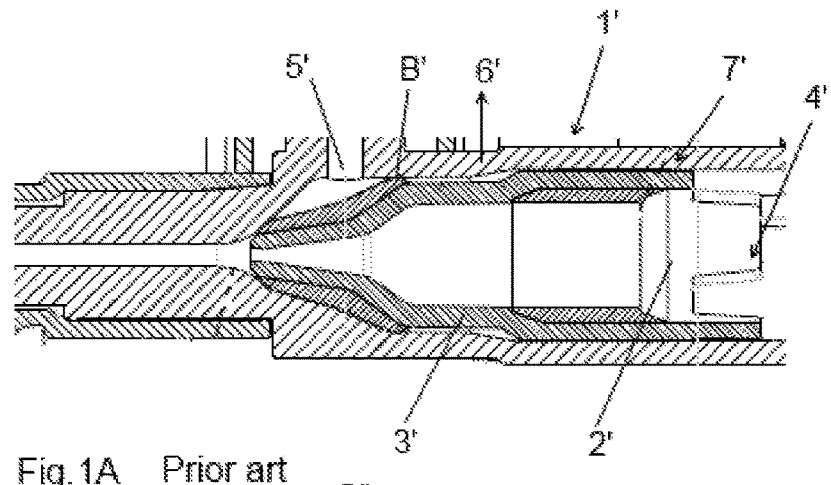
FIG. 1A shows the injector valve according to WO-A1-2014/069993 in disabling position, both disabling communication of the water inlet of the eductor with the liquid food outlet thereof and disabling communication of the water inlet with the milk based concentrate inlet of the eductor.
Figure 1B:
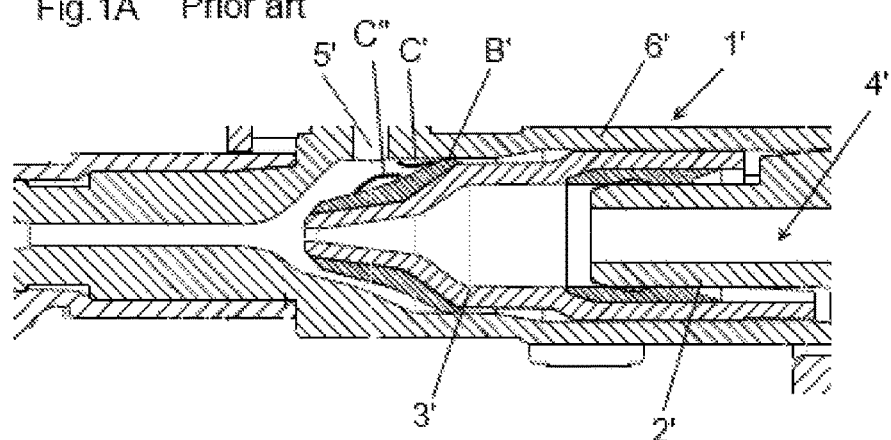
FIG. 1B shows the injector valve according to WO-A1-2014/069993 in enabling position, enabling connection of the water inlet of said eductor with both the liquid product outlet and the milk based concentrate inlet of the eductor.
Figure 1C:
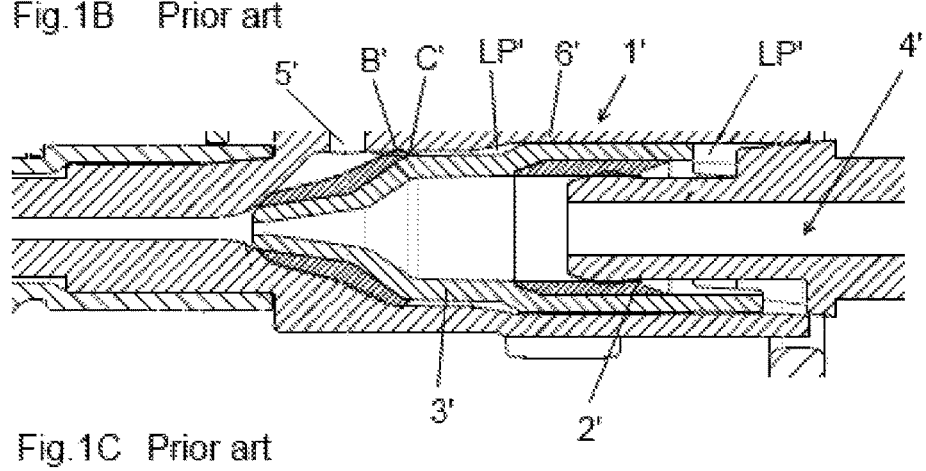
FIG. 1C shows the injector valve according to WO-A1-2014/069993 in disabling position, disabling communication of the water inlet with the milk based concentrate inlet, while enabling communication of the water inlet with the liquid food outlet of said eductor.

Please note that although the present invention will be described below by way of example only using water as the first liquid and a milk based concentrate as the second liquid, the present invention is not restricted to applications with liquid food products contained within the assembly, which preferably is disposable. Such liquid food products can e.g. be (fruit) juice/drink, an alcohol-containing drink or drink base, for instance, beer or wine, a dairy or dairy-based drink, for instance, a whey drink or permeate-based drink, (milk) shake, chocolate drink, (drinking) yoghurt, sauce, ice cream or dessert, juice and concentrated liquid food products, such as e.g. is a milk based concentrate. Other liquid products to which the present invention is applicable can comprise, for instance, vegetal or animal fat or oil, a thickener, sugar, sweeteners, flavoring, coloring and/or the like, and/or various other ingredients; a non-consumable liquid product, a body care product, a hair treating agent, liquid medicaments or the like. Consequently the first liquid and the second liquid can be formed by various liquid substances.

In FIG. 2A a schematic view in cross section of an assembly according to an exemplary embodiment of the invention is shown, in which embodiment the injector valve on its outer surface is provided with two annular protrusions which are spaced from each other by a distance that at least equals the distance between the first position and the second position of the injector valve. In this embodiment the assembly is a disposable assembly 1. FIG. 2B shows an injector valve of the disposable assembly in an enlarged view. The disposable assembly 1 comprises a holder 2 which in this embodiment is designed to contain a maximum amount of 4 liters of milk based concentrate 3.

This milk based concentrate comprises 20 wt % dry matter to 30 wt % dry matter, preferably 23-27 wt % dry matter, whereas milk with a normal water content, which latter is also called unconcentrated milk herein, comprises 10 wt % dry matter. In addition, the maximum amount of milk based concentrate contained in the holder can in other embodiments of the invention amount to 2 to 5 liters for professional use and 0.5 to 1 liter for home use and the milk based concentrate can in other embodiments comprise 20 wt % dry matter to 30 wt % dry matter, preferably 23-27 wt % dry matter. The present invention provides an assembly, system and eductor with which the complete amount of milk based concentrate can be dispensed in a corresponding number of servings (e.g. for an amount of 4 liters milk based concentrate about 180 servings) substantially without contamination of the prepared liquid food product as will become clear from the following description. When for example the used first and second liquid are not perishable it also might be possible in other embodiments of the invention to form the first protrusion on the outer surface of the injector valve and the second protrusion on the inner surface of the cylindrical wall.

The disposable assembly 1 furthermore comprises an eductor 4 having a housing 5 with a water inlet 6, a milk based concentrate inlet 7 and a liquid product outlet 8. The milk based concentrate inlet 7 of the eductor 4 is positioned between the water inlet 6 and the liquid product outlet 8. The housing 5 of the eductor 4 has a substantially cylindrical wall 9 with a longitudinal axis 10 extending from one end 11 of the cylindrical wall 9 to the other end 12 of the cylindrical wall 9, which other end 12 is opposite the one end 11. The water inlet is provided at said one end 11 of the cylindrical wall 9 for supplying water to the eductor 4 in a direction at least substantially parallel to the longitudinal axis 10. The milk based concentrate inlet 7 is positioned at said other end 12 of the cylindrical wall 9 for supplying milk based concentrate to the eductor 4 in a direction having a component perpendicular to the longitudinal axis 10. In the embodiment shown the direction is perpendicular, but it will be clear that in other embodiments the supply direction of milk based concentrate can enclose an angle with the longitudinal axis 10. The liquid product outlet 8 is arranged for discharging a liquid product from the eductor 4 in a direction at least substantially parallel to the longitudinal axis 10.

Figure 4A:
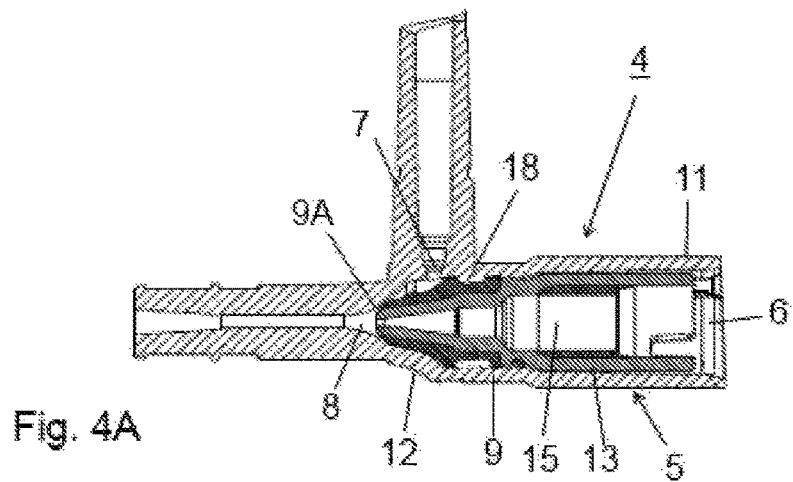
FIG. 4A shows an embodiment of an eductor according to the invention in which the injector valve is positioned in disabling position, both disabling communication of the water inlet of the eductor with the liquid food outlet thereof and disabling communication of the water inlet with the milk based concentrate inlet of the eductor.
Figure 4B:
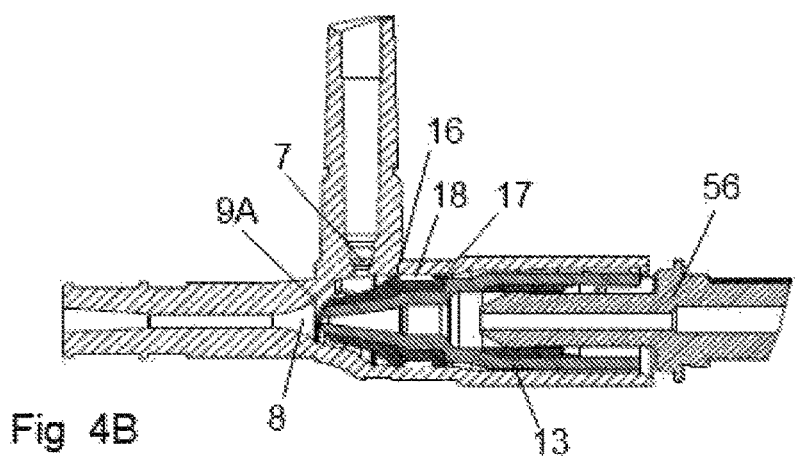
FIG. 4B shows the eductor of FIG. 4A with the injector valve in enabling position, enabling connection of the water inlet of the eductor with both the liquid product outlet and the milk based concentrate inlet of the eductor.
Figure 4C:
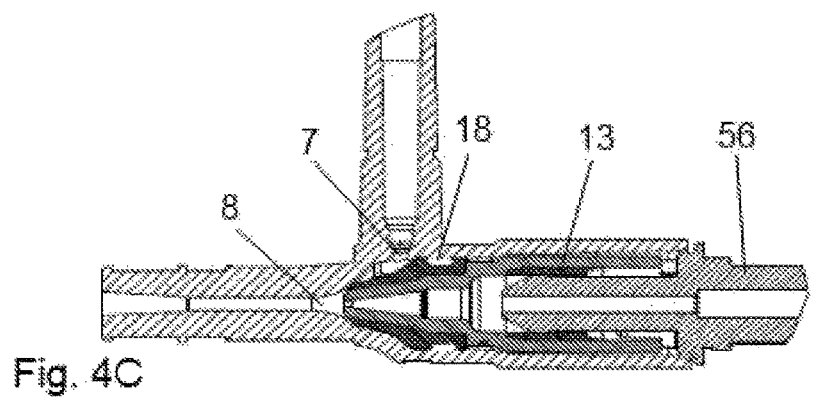
FIG. 4C shows the eductor of FIG. 4A with the injector valve in disabling position, disabling communication of the water inlet with the milk based concentrate inlet, while enabling communication of the water inlet with the liquid food outlet of said eductor.

The eductor 4 further comprising an injector valve 13 positioned within the cylindrical wall 9. The injector valve 13 comprises an outer surface 14 (FIG. 2B) partly contacting an inner surface of the cylindrical wall 9 and a central, longitudinal channel 15 for supplying water from the water inlet 6 to the liquid product outlet 8. As is shown in FIGS. 4A-4C, the injector valve 13 is arranged within the cylindrical wall 9 so as to be displaceable from a first, enabling position (FIG. 4B) to a second, disabling position (FIGS. 4A, 4C) longitudinally spaced from the first position, and vice versa. In the shown embodiment the distance between the first and second position of the injector valve is about 2 mm.

On its outer surface 14 the injector valve 13 comprises two annular protrusions 16, 17 (FIG. 2B) which are spaced from each other by a distance D that at least equals the distance between the first, enabling position and the second, disabling position of the injector valve 13. Each of the annular protrusions 16, 17 engages with the inner surface of the cylindrical wall 9 (see also FIGS. 4A-4C) for forming a seal therewith. The annular protrusions 16, 17 together with the inner surface of the cylindrical wall 9 form an annular chamber 18, which preferably is filled with an inert or sterile gas, such as nitrogen, carbon dioxide or helium. The protrusions 16, 17 are arranged and configured for isolating the annular chamber 18 from fluid communication with any environment outside the annular protrusions 16, 17 when said injector valve 13 is positioned in the first position or the second position or any position in between, meaning that there is no fluid communication path from the annular chamber 18 to the outside.

In the embodiment shown in FIG. 2B the injector valve 13 comprises a first sleeve 30 of Kraiburg TPE Thermolast K TF5STE in which first sleeve 30 the annular protrusions 16, 17 of the injector valve 13 are integrally formed. The injector valve 13 further comprises a second sleeve 31 of PP Hopo Eltex P HCW280 supporting and hermetically attached to the first sleeve of TPE. As is visible in FIG. 2B the injector valve 13 comprises a first portion FP (comprising the annular protrusions 16, 17) in which the first sleeve 30 of TPE is positioned radially outwards of the second sleeve 31 of PP and a second portion SP in which the first sleeve 30 of TPE is positioned radially inwards of the second sleeve 31 of PP. Such an injector valve 13 can be formed by two-component injection moulding. In the embodiment shown in FIG. 2B the inner diameter of the first sleeve of TPE at the position of the annular protrusions is about 7 mm and the thickness of the wall of the first sleeve of TPE at the position of the annular protrusions is about 2 mm. The distance D between the two annular protrusions 16, 17 is about 4.6 mm, and the protrusions project about 0.25 mm from the bottom 18A of the annular chamber 18. Although in the shown exemplary embodiment the first sleeve (as the first part) is made of TPE (as the first material), it will be clear for a person skilled in the art that also other materials that can withstand thermal loads (including thermal expansion and thermal shrinkage) exerted thereon while still providing sufficient compressibility and elasticity (i.e. sufficiently short relaxation time) for providing a correct seal can be used instead, such as a silicone, PPE, 1-PPE or LL-PPE. In addition, although in the shown exemplary embodiment the second sleeve (as the second part) is made of PP (as the second material), it will be clear for a person skilled in the art that also other materials that can provide mechanical stability over a prolonged period of time to the first part with the protrusions, such as a polyarylether ketone PAEK, in particular PEEK (polyether ether ketone), a Polyethylene terephthalate thermoplastic (PET) polymer, a Polysulfone thermoplastic (PES) polymer, or a Polyoxy methylene thermoplastic (POM) polymer.

In the embodiment shown in FIGS. 2A and 4A-4C the liquid product outlet 8 is formed by a converging wall part 9A of the cylindrical wall 9. The injector valve 13 comprises a converging part 13A (FIG. 2B) directed towards the converging wall part 9A. In the second, disabling position (FIGS. 4A, 4C) an outer surface of the converging part 13A of the injector valve 13 engages with the inner surface of the converging wall part 9A of the cylindrical wall 9 for forming a seal therewith, thereby disabling fluid communication of the milk based concentrate inlet 7 of the eductor 4 with the liquid product outlet 8 of the eductor and vice versa. In the first, enabling position of the injector valve 13 (FIG. 4B) the converging part 13A of the injector valve 13 is free from the converging wall part 9A thereby enabling fluid communication of the milk based concentrate inlet 7 of the eductor 4 with the liquid product outlet 8 thereof. Please note that it will be clear that the converging part 13A of the injector valve 13 does not extend to the annular protrusions 16, 17.

Referring to FIG. 2A the disposable assembly 1 is in addition provided with a microfiltration device 19 as disclosed in WO-A1-2014/069993, although in other embodiments of an assembly or system according to the invention the microfiltration device can be dispensed with, and a transfer tube 19A connecting the liquid product outlet 8 of the eductor 4 with a product inlet opening of the microfiltration device 19. Furthermore, a milk based concentrate tube 20 connects the holder 2 to the milk based concentrate inlet 7 of the eductor 4 and a water inlet tube 21 connects to the water inlet 6 of the eductor 4. This water inlet tube 21 is configured for connection to an external source of water, preferably a source of hot water under pressure. Please note that with "external source of water" a water source external in relation to the assembly is meant.

In the following, air is discussed as the gas to be supplied to the microfiltration device, however, according to an alternative embodiment, the gas can comprise, for instance, an inert gas or another gas or gas mixture, for example containing nitrogen or carbon dioxide.

An air inlet tube 23 of the assembly is arranged for connecting the microfiltration device 19 to an external source of air, preferably an external source of air under (slight) overpressure. As shown in FIG. 2A, a liquid product outlet tube 25 of the assembly connects to an outlet opening of the microfiltration device 19 for discharging a liquid product from the disposable assembly 1.

Figure 3:
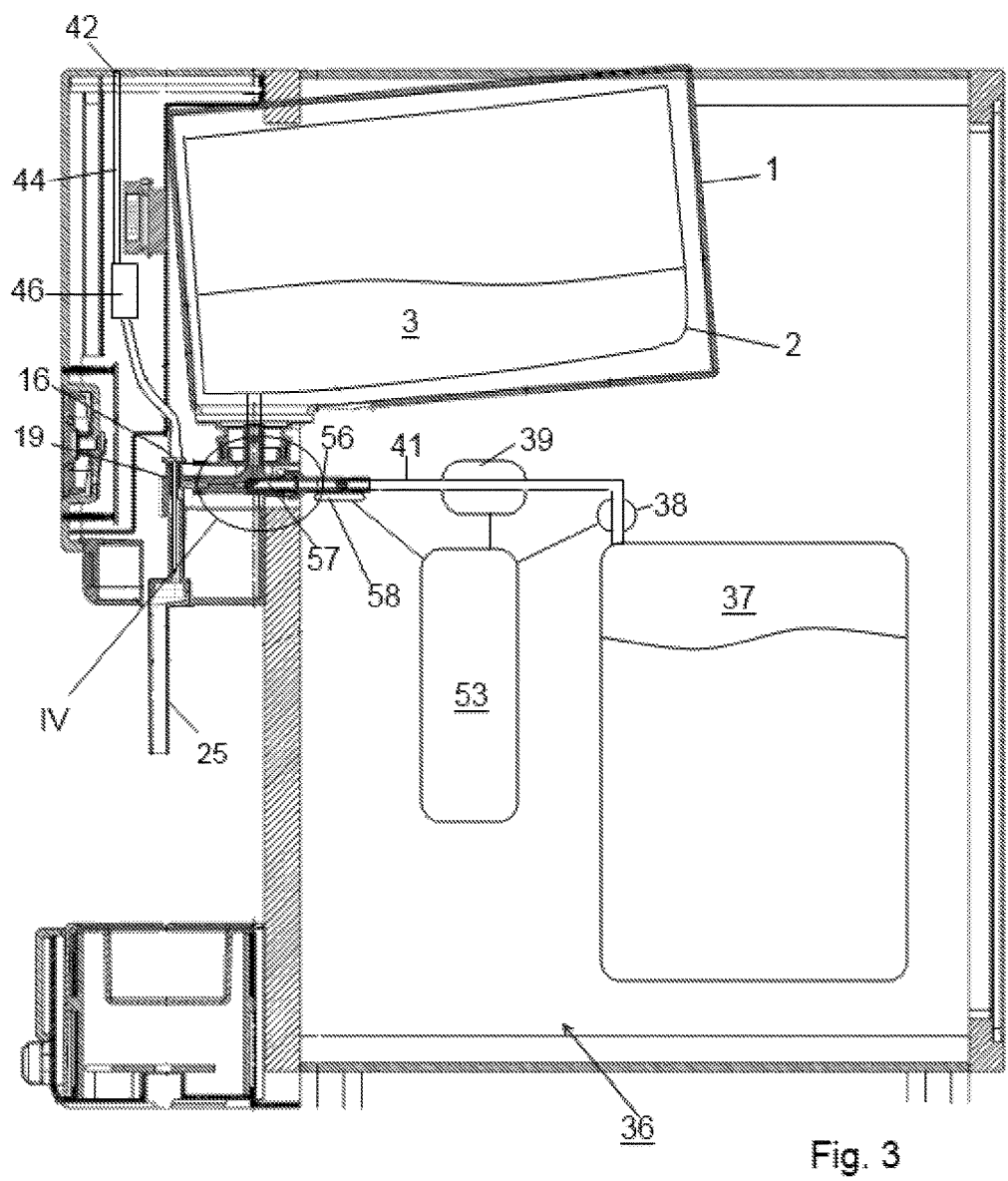
FIG. 3 shows a schematic view in cross section of an embodiment of a system for preparing a liquid food product, in particular a foamed food product according to the invention in which the disposable assembly comprises an eductor according to the invention.

In FIG. 3 a schematic view in cross section of an exemplary embodiment of a system for preparing a liquid product with a disposable assembly 1 as described above is shown. The system comprises a product preparation apparatus 36 for preparing a liquid product and a disposable assembly 1 according to the invention. The product preparation apparatus 36 comprises an injector valve actuator 56 arranged for engaging the injector valve 13. The water inlet 6 of the eductor 4 is configured for connection to an external source of water 37 via a water line 41. The air inlet tube 23 of the disposable assembly 1 is configured for connection to an external source of air via an air line 44 in which an air compressor 46 is incorporated.

In the product preparation apparatus 36 the water reservoir 37 is provided as well as the pump 38 as a means for pressurizing water. From the water reservoir 37 the water line 41 runs through the product preparation apparatus 36 and is configured for detachable connection to the water inlet 6 of the disposable assembly 1 for supplying water to the water inlet 6 of the eductor 4 of the disposable assembly 1.

In the product preparation apparatus 36 also the source of air 42, in this case an opening in the product preparation apparatus 36 to the ambient atmosphere, is provided in which the opening is closed off by a grid for preventing larger particles passing the opening. From the source of air 42 the air line 44 runs through the product preparation apparatus 36 and is configured for detachable connection to the air inlet tube 23 of the disposable assembly 1 for supplying air to the air inlet tube 23 of the microfiltration device 19 of the disposable assembly 1.

The product preparation apparatus 36 further comprises an operating device 53, e.g. a microprocessor, for controlling the operation of the product preparation apparatus 36. For this, the operating device 53 is via lines connected to the relevant devices or components of the apparatus 36.

The injector valve actuator 56 is—after connection of the disposable assembly 1 to the product preparation apparatus 36—in engagement with the injector valve 13 and is operable under control of the operating device 53 for positioning the injector valve 13 either in the first, enabling position for enabling fluid communication of the milk based concentrate inlet 7 of the eductor 4 with the liquid product outlet 8 of the disposable assembly 1 (as shown in FIG. 4B) or for positioning the injector valve 13 in a disabling position (as shown in FIGS. 4A and 4C) for disabling said fluid communication. Furthermore, the injector valve actuator 56 is arranged such as to be displaceable, in particular rotatable from a first position (shown in FIG. 4A; which position preferably is the default position immediately after connecting the disposable assembly 1 to the product preparation apparatus 36) for preventing fluid communication of the eductor with the external source 37 of water to a second position (shown in FIGS. 4B and 4C) in which fluid communication of the eductor with the external source 37 of water is enabled and fluid under pressure can be supplied to the eductor.

In the embodiment shown in FIGS. 2A, 2B and 4A-4C, the injector valve 13 is a rotatable injector valve.

During operation of the system for preparing a foamed food product, the operating device 53 first controls the operation of the heater 39 for heating water and the means for pressurizing water, in particular the pump 38, such that the water can be heated up to a desired temperature. A predetermined time period after the operating device 53 has activated the heater 38 and the pump 38 the operating device 53 activates the injector valve actuator 56 into rotation so that the injector valve 13, which preferably is biased in the disabling position, is rotated to the enabling position by engagement with the injector valve actuator 56. Then the heated water, which has already been pressurized, is passed to the eductor 4 and milk based concentrate 3 is entrained out of the holder. After a serving of the liquid food product, i.e. in this case milk froth, has been dispensed, the operating device 53 controls the injector valve actuator 56 for rotating and displacing the injector valve 13 in the disabling position, and a predetermined time period thereafter, e.g. a time period of between 2 to 10 seconds, deactivates the heater 39 and the pump 38, and optionally the air compressor 46.

During the entrainment of milk based concentrate out of the holder 2 milk based concentrate can settle on the part of the inner surface of the cylindrical wall between the milk based concentrate inlet 7 and the annular protrusion 16 closest to the milk based concentrate inlet 7. During displacement of the injector valve 13 from the enabling position towards the disabling position the annular protrusion 16 closest to the milk based concentrate inlet 7 swipes over this settled milk based concentrate, which latter therefore comes into contact with the inert gas in the annular chamber 18 and consequently will not be contaminated. Since the distance D between the two annular protrusions at least equals the distance between the first position and the second position of the injector valve the annular protrusion 17 farthest away from the milk based concentrate inlet 7 prevents that this settled milk based concentrate comes into contact with ambient air, and thus prevents any contamination of the milk based concentrate. In the shown embodiment the distance D is about two times the distance between the first position and the second position of the injector valve 13.

Figure 5:
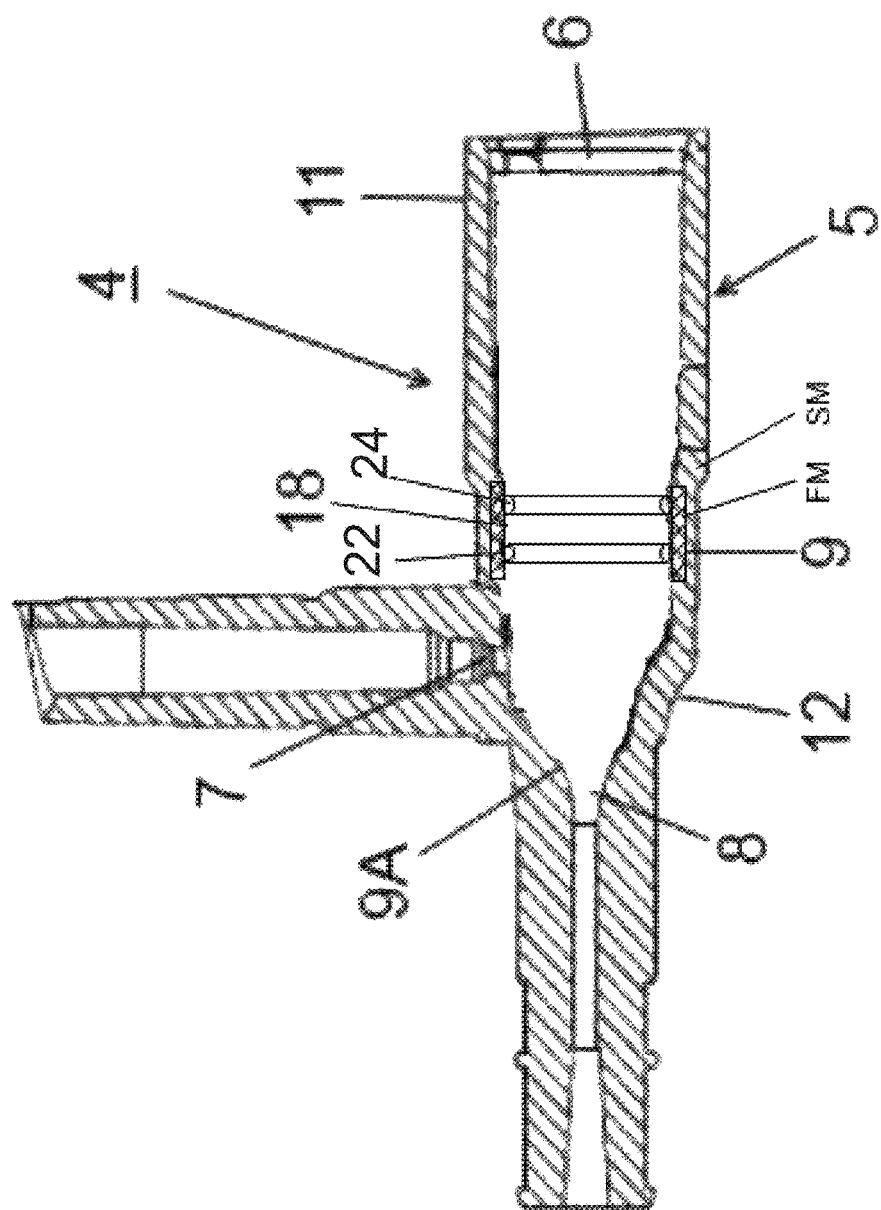
FIG. 5 shows an embodiment of an eductor according to the invention in which the inner surface of the cylindrical wall comprises two annular protrusions.

In FIG. 5 a schematic view in cross section of an assembly according to another exemplary embodiment of the invention is shown (for convenience the injector valve has been left out), in which embodiment the inner surface of the cylindrical wall 9 is provided with two annular protrusions 22, 24 which are spaced from each other by a distance that at least equals the distance between the first position and the second position of the injector valve. With the injector valve inserted in the cylindrical wall the protrusions 22, 24 form an annular chamber 18 with the outer wall of the injector valve. Please note, that the protrusions 22, 24 on the inner surface of the cylindrical wall can be used in addition to or as alternative to the protrusions provided on the outer surface of the injector valve. With the reference character FM in FIG. 5 the first part of the first material is indicated and with the reference character SM the second part of the second material is indicated. The first and second material used can be the same as used for the injector valve or can be other materials fulfilling the same requirements.

The invention claimed is:

1. An eductor suitable for use in an assembly for preparing a liquid product, the eductor comprising:
   (A) a housing having a substantially cylindrical wall with a longitudinal axis extending from one end of the cylindrical wall to the other end of the cylindrical wall opposite the one end, the housing having:
      (i) a first liquid inlet at the one end of the cylindrical wall for supplying a first liquid to the eductor in a direction at least substantially parallel to the longitudinal axis;
      (ii) a second liquid inlet at the other end of the cylindrical wall for supplying a second liquid to the eductor in a direction having a component perpendicular to the longitudinal axis; and
      (iii) a liquid product outlet for discharging a liquid product from the eductor in a direction at least substantially parallel to the longitudinal axis, the second liquid inlet of the eductor seen in longitudinal direction being positioned between the first liquid inlet and the liquid product outlet; and
   (B) an injector valve positioned within the cylindrical wall, the injector valve comprising:
      (i) an outer surface and a central, longitudinal channel for supplying the first liquid from the first liquid inlet to the liquid product outlet; and
      (ii) the injector valve being displaceably arranged within the cylindrical wall from a first position to a second position longitudinally spaced from the first position, and vice versa; and
   wherein
      either
      (iii) the outer surface comprises two annular protrusions which are spaced from each other by a distance that at least equals the distance between the first position and the second position of the injector valve,
         (a) wherein each of the annular protrusions engage the inner surface of the cylindrical wall for forming a seal therewith,
         (b) wherein the annular protrusions, together with the inner surface of the cylindrical wall, form an annular chamber, and
         (c) wherein the annular protrusions are arranged so as to isolate the annular chamber from fluid communication with an environment outside the annular protrusions when the injector valve is positioned in the first position or the second position or any position therebetween,
      or
      (iv) the inner surface of the cylindrical wall comprises two annular protrusions which are spaced from each other by a distance that at least equals the distance between the first position and the second position of the injector valve,
         (a) wherein each of the annular protrusions engage the outer surface of the injector valve for forming a seal therewith,
         (b) wherein the annular protrusions, together with the outer surface of the injector valve, form an annular chamber, and
         (c) wherein the annular protrusions are arranged to isolate the annular chamber from fluid communication with an environment outside the annular protrusions when the injector valve is positioned in the first position, the second position, or any position therebetween.

2. The eductor according to claim 1, wherein the annular protrusions are made in a first part of a first material capable of withstanding thermal loads exerted thereon while still providing sufficient compressibility and elasticity for providing a correct seal, the first part of the first material being hermetically attached to a second part of a second material,
wherein the second material is different from the first material, and
wherein the second material provides mechanical stability over a predetermined period of time to the first part of the first material with the annular protrusions.

3. The eductor according to claim 2, wherein the first part of the first material and the second part of the second material are chemically bonded to each other along a contact surface without using additives.

4. The eductor according to claim 2, wherein the first part of the first material and the second part of the second material are formed by two-component injection molding.

5. The eductor according to claim 2, wherein the first material is a thermoplastic elastomer (TPE), silicone, PPE, 1-PPE or LL-PPE.

6. The eductor according to claim 2, wherein the second material is polypropylene (PP), a polyarylether ketone (PAEK), a polyether ether ketone (PEEK), a polyethylene terephthalate thermoplastic (PET) polymer, a polysulfone thermoplastic (PES) polymer, or a polyoxy methylene thermoplastic (POM) polymer.

7. The eductor according to claim 2, wherein in a first portion of the injector valve or the inner surface of the cylindrical wall, the first part of the first material is positioned radially outwards of the second part of the second material and
wherein in a second portion of the injector valve or the inner surface of the cylindrical wall, the first part of the first material is positioned radially inwards of the second part of the second material.

8. The eductor according to claim 1, wherein the liquid product outlet is formed by a converging wall part of the cylindrical wall,
wherein the injector valve comprises a converging part directed towards the converging wall part of the cylindrical wall,
wherein the first position of the injector valve is an enabling position for enabling fluid communication of the second liquid inlet of the eductor with the liquid product outlet of the eductor,
wherein the second position is a disabling position for disabling fluid communication of the second liquid inlet of the eductor with the liquid product outlet of the eductor and vice versa,
wherein in the second position of the injector valve, an outer surface of the converging part engages with the inner surface of the converging wall part of the cylindrical wall for forming a seal therewith.

9. The eductor according to claim 8, wherein the outer surface of the converging part of the injector valve is made of a first material capable of withstanding thermal loads exerted thereon while still providing sufficient compressibility and elasticity for providing a correct seal.

10. The eductor according to claim 1, wherein the annular chamber is filled with an inert or sterile gas.

11. The eductor according to claim 1, wherein the distance between the two annular protrusions is larger than the distance between the first position and the second position of the injector valve.

12. An assembly for preparing a liquid product, the assembly comprising:
(A) a holder containing a second liquid;
(B) an eductor according to claim 1;
(C) a second liquid tube connecting the holder to the second liquid inlet of the eductor;
(D) a first liquid inlet tube connecting the first liquid inlet of the eductor with a first liquid connection of the assembly, the first liquid connection being configured for connection to an external source of the first liquid; and
(E) a liquid product outlet tube connecting the liquid product outlet of the eductor to an outlet connection of the assembly for discharging a prepared liquid product from the assembly.

13. An assembly for preparing a liquid product, the assembly comprising:
(A) a holder containing a second liquid;
(B) an eductor according to claim 1;
(C) a microfiltration device having a liquid product inlet and a liquid product outlet;
(D) a transfer tube connecting the liquid product outlet of the eductor with the liquid product inlet of the microfiltration device;
(E) a second liquid tube connecting the holder to the second liquid inlet of the eductor;
(F) a first liquid inlet tube connecting the first liquid inlet of the eductor with a first liquid connection of the assembly, the first liquid connection being configured for connection to an external source of the first liquid;
(G) a gas inlet tube connecting the microfiltration device to a gas connection of the assembly, the gas connection being configured for connection to an external source of gas under pressure; and
(H) a liquid product outlet tube connecting the liquid product outlet of the microfiltration device to an outlet connection of the assembly for discharging a prepared liquid product from the assembly.

14. The assembly according to claim 12, wherein the second liquid is a liquid food product and the first liquid is water.

15. A system for preparing a liquid product, the system comprising:
a product preparation apparatus for preparing the liquid product and an assembly according to claim 13, wherein the liquid product preparation apparatus comprises:
(i) a first liquid source,
(ii) a heater for heating the first liquid source,
(iii) a line for supplying the first liquid and configured for detachable connection to the first liquid connection of the assembly for supplying the first liquid to the first liquid inlet of the eductor of the assembly, and
(iii) a source of pressurized gas, the source of pressurized gas being configured for detachable connection to the gas connection of the assembly for supplying pressurized gas to the gas inlet of the microfiltration device.

16. A system according to claim 15, wherein the product preparation apparatus comprises an injector valve actuator, the injector valve actuator being arranged for engaging the injector valve, wherein the injector valve actuator is operable for:
positioning the injector valve in the enabling position, and
positioning the injector valve in the disabling position.

17. The assembly according to claim 14, wherein the liquid food product is a milk-based concentrate.

18. The assembly of claim 12, wherein the first liquid is under pressure.

19. The assembly of claim 13, wherein the first liquid is under pressure.

20. The system for preparing a liquid product of claim 15, wherein the liquid product preparation apparatus further comprises a pump for pressurizing the first liquid.

21. An eductor suitable for use in an assembly for preparing a liquid product, the eductor comprising:
   (A) a housing having a substantially cylindrical wall with a longitudinal axis extending from one end of the cylindrical wall to the other end of the cylindrical wall opposite the one end, the housing having:
      (i) a first liquid inlet at the one end of the cylindrical wall for supplying a first liquid to the eductor in a direction at least substantially parallel to the longitudinal axis;
      (ii) a second liquid inlet at the other end of the cylindrical wall for supplying a second liquid to the eductor in a direction having a component perpendicular to the longitudinal axis; and
      (iii) a liquid product outlet for discharging a liquid product from the eductor in a direction at least substantially parallel to the longitudinal axis, the second liquid inlet of the eductor seen in longitudinal direction being positioned between the first liquid inlet and the liquid product outlet; and
   (B) an injector valve positioned within the cylindrical wall, the injector valve comprising:
      (i) an outer surface and a central, longitudinal channel for supplying the first liquid from the first liquid inlet to the liquid product outlet; and
      (ii) the injector valve being displaceably arranged within the cylindrical wall from a first position to a second position longitudinally spaced from the first position, and vice versa; and
      (iii) the outer surface comprises two annular protrusions which are spaced from each other by a distance that at least equals the distance between the first position and the second position of the injector valve,
      (a) wherein each of the annular protrusions engage the inner surface of the cylindrical wall to form a seal therewith,
      (b) wherein the annular protrusions, together with the inner surface of the cylindrical wall, form an annular chamber,
      (c) wherein the annular protrusions are arranged to isolate the annular chamber from fluid communication with an environment outside the annular protrusions when the injector valve is positioned in the first position, the second position or a position between the first position and the second position,
      (d) wherein the inner surface of the cylindrical wall comprises two further annular protrusions which are spaced from each other by a distance that at least equals the distance between the first position and the second position of the injector valve,
      (e) wherein each of the further annular protrusions engage the outer surface of the injector valve to form another seal therewith,
      (f) wherein the further annular protrusions, together with the outer surface of the injector valve, form a further annular chamber, and
      (g) wherein the further annular protrusions are arranged to isolate the further annular chamber from fluid communication with an environment outside the further annular protrusions when the injector valve is positioned in the first position, the second position, or any position therebetween.

* * * * *